Figure 1:
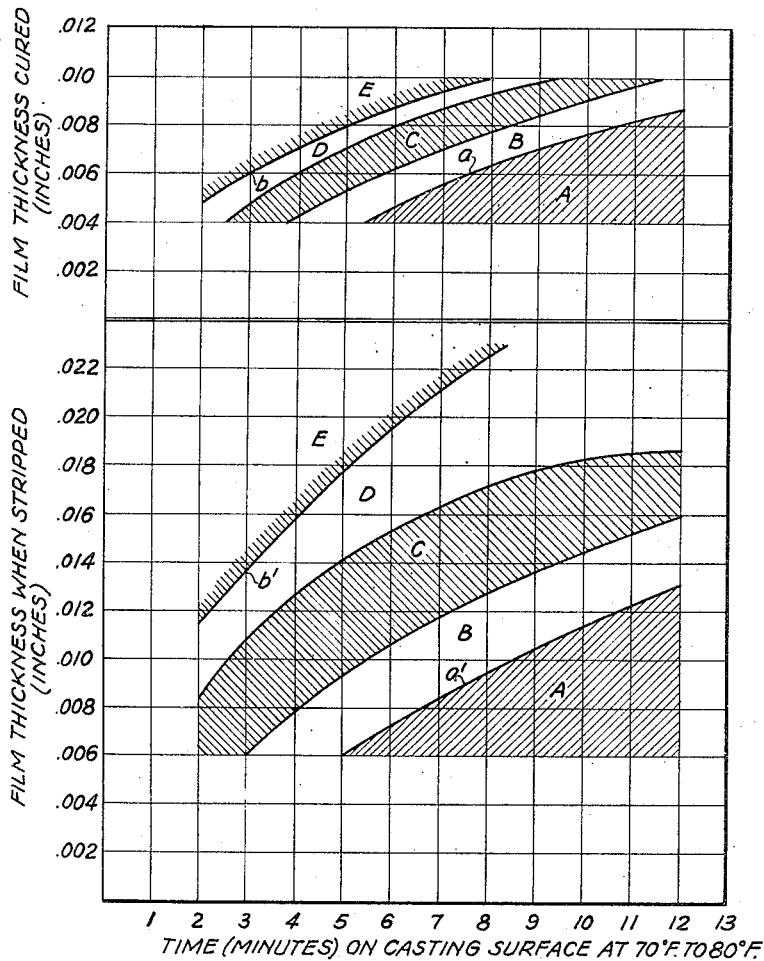

Jan. 3, 1950   C. R. FORDYCE ET AL   2,492,977
CELLULOSE ACETATE SOLUTION
Filed Nov. 5, 1946   2 Sheets-Sheet 1

Charles R. Fordyce
Bruce E. Gramkee
INVENTORS
ATTORNEYS

Jan. 3, 1950   C. R. FORDYCE ET AL   2,492,977
CELLULOSE ACETATE SOLUTION
Filed Nov. 5, 1946   2 Sheets-Sheet 2

Charles R. Fordyce
Bruce E. Gramkee
INVENTORS

Patented Jan. 3, 1950

2,492,977

UNITED STATES PATENT OFFICE 2,492,977

CELLULOSE ACETATE SOLUTION

Charles R. Fordyce and Bruce E. Gramkee, Rochester, N. Y., assignors to Eastman Kodak Company, Rochester, N. Y., a corporation of New Jersey Application November 5, 1946, Serial No. 707,807

3 Claims. (Cl. 106—190)

This invention relates to a cellulose acetate solution.

For many years cellulose nitrate has occupied a unique position as a material for the production of commercial motion picture film base. Since the advent of commercial cinematography some forty years ago, cellulose nitrate has remained preeminent as a base for motion picture film by virtue of the fact that it displays a peculiar combination of high tensile strength, flexibility, moisture resistance and rigidity. High tensile strength is necessary to give the film the wearing qualities which will enable it to resist the tearing and abrading action which occurs at the perforations when the film is passed over the sprockets of processing and projection machines. Flexibility is essential to proper behavior on handling. Good moisture resistance is necessary to prevent excessive curl under conditions of varying humidity, to prevent the development of waviness which would otherwise result from variations in the moisture content, and to reduce the dimensional change which the photographic film undergoes in the drying operation following development of the photographic image. Good rigidity, not only reduces the tendency of the photographic film to curl, but also helps prevent unsteadiness during projection.

All of these desirable qualities are possessed to a high degree by cellulose nitrate film. Cellulose nitrate is, however, an inorganic acid ester of cellulose and film made therefrom has the drawback of inflammability and instability, the film becoming discolored and brittle on long standing unless the cellulose nitrate has been manufactured with the greatest of care and skill.

In the entirely separate and distinct field of organic acid esters of cellulose, many such esters have been suggested for use in producing commercial motion picture film base; of these esters, cellulose acetate and related cellulose mixed esters, such as cellulose acetate propionate and cellulose acetate butyrate have thus far proved to be the most useful. However, those esters which are susceptible of casting into films from acetone, although quite satisfactory for use in the production of cut sheet, X-ray amateur cine and other types of films in the use of which safety is the paramount factor desired, nevertheless do not give to films the physical properties enumerated above so as to permit their use for this purpose in the commercial motion picture field. For example, films produced from acetone-soluble cellulose acetate have low tensile strength, poor dimensional stability and a lower degree of rigidity than cellulose nitrate films. Moisture susceptibility is a particular defect of such cellulose acetate films giving rise to a dimensional change, as shown by swell and shrink measurements, of about twice that desired. Also, commercial motion picture films vary in swell and shrink amplitude from about 0.5% to 0.8%, whereas the cellulose acetate safety films available up to the present time vary in swell and shrink amplitude from 1% to often as high as 1.75% and have been for this reason, among others, unsuitable for professional motion picture use. Similarly, films produced from the mixed esters, although in some cases equal to commercial motion picture films in dimensional stability, are inferior in tensile strength and rigidity.

Among attempts to provide a satisfactory cellulose organic acid ester cine film base many investigators have thought that fully esterified cellulose (cellulose triacetate) would have potential value for this purpose if some means could be devised for satisfactorily dealing with it in the casting or film-forming operation.

While films produced from cellulose triacetate have moisture resistance which is superior to that of films produced from acetone-soluble cellulose acetate, and a higher tensile strength, the material has very limited solubility and has presented extreme technical difficulties in the casting operation. Methylene chloride, and more particularly mixtures of methylene chloride with methyl or ethyl alcohol, have for many years been about the only useful active solvents for cellulose triacetate and even today are the only practical basic solvents adapted for commercial use. It has been found, however, that films cast under the usual conditions heretofore known to the art, from solutions of cellulose triacetate in these solvent mixtures, have certain undesirable characteristics, such as brittleness, which make them of inferior value in the commercial motion picture industry.

Fully as important as the above-mentioned deficiencies of known cellulose triacetate film-forming compositions is the fact that there is an economic disadvantage in their use, because of the much lower speeds heretofore attainable in the casting operation.

We have discovered that cellulose acetate having an acetyl content of from 42.5% to 44.0% will, when formed into a sheet in the manner hereinafter described, give a sheet which has properties admirably suited for photographic film base of a character fully as acceptable and even in some respects superior to present day commercial motion picture film base.

An object is to provide compositions from high-acetyl cellulose acetates adapted for the casting of film base having such physical properties as to render it acceptable for use in the commercial motion picture industry. Still another object is to provide from high-acetyl cellulose acetates, compositions adapted for the casting at high speeds of cine film base having high tensile strength, good flexibility, moisture resistance and rigidity, non-inflammability and good stability.

These objects are accomplished by the following invention which is based fundamentally upon the very unusual discovery that solutions of certain high-acetyl cellulose acetates in menthylene chloride-alcohol may be converted into solutions which are capable of being cast by our process into film base having physical properties highly desirable for commercial motion picture film base, by adding a special diluent thereto. Specifically we have found that if a cellulose acetate containing from 42.5% to 44.0% acetyl and preferably 43.0% to 43.5% acetyl is dissolved in a solvent composed of 65% to 90% by weight methylene chloride, from 5% to 15% methyl alcohol or ethyl alcohol, and, as a special ingredient, 5% to 20%, based on the weight of the total solvent, or propylene chloride, the resulting solution may be cast and stripped from the casting surface under certain special conditions which will result in a film having special properties highly desirable for commercial motion picture film base. Hereinafter, when we refer to high-acetyl cellulose acetate as used in our invention, we refer to cellulose acetate having an acetyl content of from 42.5% to 44.0%.

As to the special conditions, our film-forming solution is deposited upon a film-forming surface which is maintained within the practical limits of 50° F. to 90° F. and is allowed to remain on such film-forming surface only until the film has cured down to 125% to 50% greater than the thickness which the film will have when completely cured, whereupon the film is stripped from the film-casting surface and subjected to further curing in the usual manner known to the art.

The unusual and distinctive property of propylene chloride by virtue of which it converts the methylene chloride-alcohol solvent combination to an unusually effective casting solvent for high-acetyl cellulose acetate is brought into sharp relief when one takes into consideration the fact that closely related solvents such as butylene chloride as well as such solvents as acetone, methyl ethyl ketone, benzene and many others, have no such effect when added to methylene chloride-alcohol, and films cast from such solvent combinations do not have the required physical properties. We have also discovered that ethylene chloride has an effect similar to that of propylene chloride but requires a different range of proportions and different range of stripping thickness from that of the propylene chloride compositions, as described and claimed in our application of even date, Serial No. 707,808.

In the following examples and description we have set forth several of the preferred embodiments of our invention, but they are included merely for purposes of illustration and not as a limitation thereof.

Figure 2:
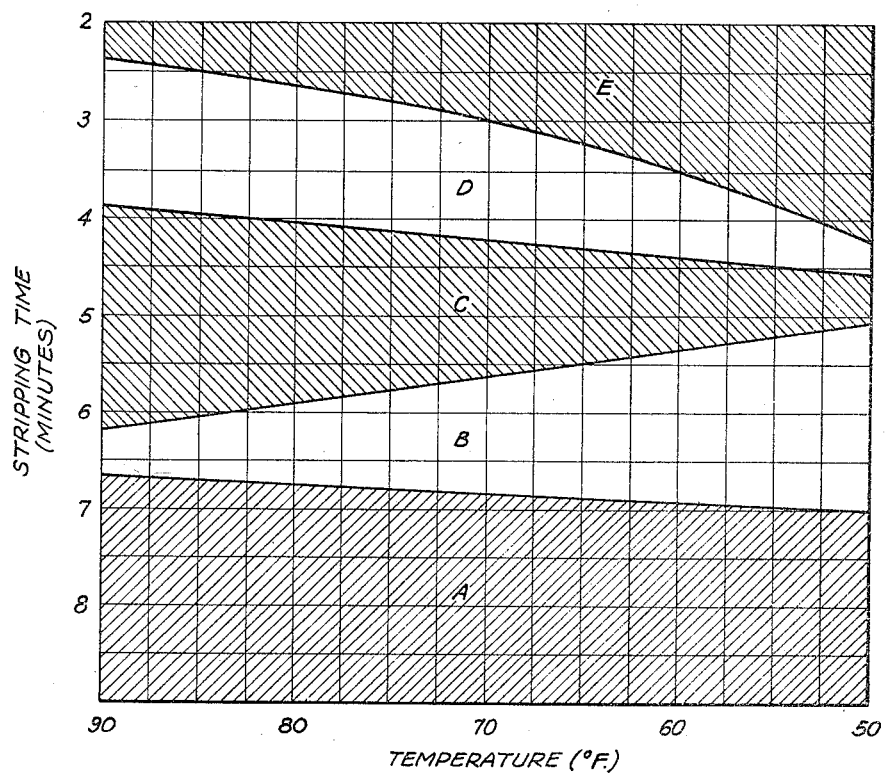

In the accompanying drawings:

Fig. 1 and Fig. 2 are graphic representations of certain of the conditions under which our process is operated.

Typical film-forming operations carried out in accordance with our invention are given in the following examples:

Example 1

100 parts by weight of cellulose acetate of 43.0% acetyl content was dissolved in a mixture of 480 parts by weight of methylene chloride and 60 parts of methyl alcohol. After the cellulose ester had completely dissolved, 60 parts of propylene chloride and 15 parts of triphenyl phosphate were added. The mixture was stirred until completey homogeneous and then allowed to stand until free from bubbles.

The solution was maintained at 80° F. and fed into the hopper of a film casting machine from which it was applied in uniform thickness to the surface of a rotating casting wheel at a temperature of 75° F. in such a thickness as to obtain a film of .0055 inch thickness upon complete evaporation of the solvent. After a period of six minutes upon the casting surface the film was stripped therefrom. The thickness at stripping was found to be .0085", this thickness being approximately 55% greater than the cured thickness. The film was then carried through a series of suitable curing sections to evaporate residual solvent and then wound into a roll. The product was found to be a clear, transparent film showing a flexibility of 12–16 folds and a tensile strength of 22.4 kilograms (15,100 pounds per square inch). The dimensional swell and shrink was found to be 0.75% in the lengthwise direction and 0.88% in the widthwise direction. This example falls within area B of the graphs of Figs. 1 and 2.

As a comparison, similar runs under similar conditions to Example 1 involving use of the same cellulose ester dissolved in mixtures of methylene chloride and methyl alcohol without the addition of a third component were made, but in this case the film could not be stripped from the casting surface until it was less than 50% greater in thickness than the cured thickness and gave a considerably more brittle film and one with much greater swell and shrink amplitude than that produced according to Example 1. Similarly, the use of ethylene chloride in place of propylene chloride, under similar conditions to Example 1, resulted in films of much less dimensional stability. The exceptional individuality of propylene chloride in the instant invention as compared with ethylene chloride as an ingredient of the solvent formula, or with methylene chloride-alcohol without such a diluent, all under similar conditions, is shown in the following table:

| Solvent Composition | Swell and Shrink Amplitude | |
|---|---|---|
| | Length | Width |
| 90% Methylene chloride<br>10% Methyl alcohol | 1.02 | 1.12 |
| 75% Methylene chloride<br>15% Ethylene chloride<br>10% Methyl alcohol | 1.04 | 1.22 |
| 85% Methylene chloride<br>5% Propylene chloride<br>10% Methyl alcohol | .86 | .92 |
| 75% Methylene chloride<br>15% Propylene chloride<br>10% Methyl alcohol | .70 | .85 |

Example 2

A film-casting solution composed of 100 parts of cellulose acetate of 43.8% acetyl content and 430 parts of methylene chloride and 50 parts of methyl alcohol was prepared as in the preceding example and there was then added 120 parts of propylene chloride and 25 parts of triphenyl phosphate. Film was continuously cast from this solution by depositing it at 80° F. on the surface of a rotating casting wheel maintained at 75° F., and in such thickness as to result in a completely cured film .0055" thick. After 6¾ minutes on the casting surface the film was stripped therefrom and found at stripping to be .0083" thick, this thickness being approximately 51% greater than the cured thickness. After complete curing the resulting film was a clear, strong, transparent and flexible product having a flexibility of 17–18 folds, a tensile strength of 22.1 kilograms (14,900 pounds per square inch), and a swell and shrink amplitude of 0.61% in the lengthwise direction and 0.75% in the widthwise direction. This example falls within area B of the graph of Figs. 1 and 2.

*Example 3*

100 parts of a cellulose acetate of 44.0% acetyl content was dissolved in a mixture of 680 parts of methylene chloride and 80 parts of methyl alcohol after which there was added 40 parts of propylene chloride and 10 parts of triphenyl phosphate. The solution at 80° F. was continuously cast into a film using a moving casting surface maintained at a temperature of 70° F. and under such conditions as to produce a film .0055" thick. The film was removed from the casting surface after a period of 5¾ minutes in which time it was found to have a thickness of .0090" thick, this thickness being approximately 64% greater than the cured thickness. After complete curing a clear, transparent, flexible film of high tensile strength was obtained which had a swell and shrink amplitude of .75% in the lengthwise direction and .85% in the widthwise direction. This example falls within area B of the graph of Figs. 1 and 2.

*Example 4*

A cellulose acetate solution prepared identically to that in Example 1 was cast at 80° F. onto a moving casting surface also maintained at 80° F. in such an amount as to produce a completely cured film of .0056" thickness. After three minutes on the casting surface this film was continuously removed under which condition it was found to have a thickness of .012", this thickness being approximately 114% greater than the cured thickness. After evaporation of the residual solvent the product was found to have a tensile strength of 23 kilograms (15,500 pounds per square inch), a flexibility of 18 folds and a swell and shrink amplitude of 0.62% in the lengthwise direction and 0.89% in the widthwise direction. It is to be noted that in this example the film was cast at a speed twice that at which the film of Example 1 was cast, thus falling within high speed operating areas D of the graph of Figs. 1 and 2.

*Example 5*

100 parts by weight of cellulose acetate of 43.0% acetyl content was dissolved in a mixture of 480 parts of methylene chloride and 60 parts of ethyl alcohol. After the cellulose ester had completely dissolved, 60 parts of propylene chloride and 15 parts of triphenyl phosphate were added. The mixture was stirred until completely homogeneous and then allowed to stand until free from bubbles.

The solution was maintained at 80° F. and fed into the hopper of a film-casting machine from which it was applied in uniform thickness to the moving surface of a casting wheel maintained at a temperature of 75° F. in such a thickness as to obtain a film of .0055" upon complete evaporation of the solvent. After a period of six minutes upon the casting surface the film was removed therefrom. The thickness at this time was found to be .0090", this thickness being approximately 64% thicker than the cured thickness. The film was carried through suitable curing sections to evaporate remaining solvent and then wound into a roll. The product was found to be a clear, transparent film of good flexibility and strength. This example falls within area B of the graph of Figs. 1 and 2.

*Example 6*

A cellulose acetate solution prepared identically to that in Example 1 was cast at 80° F. onto a casting surface maintained at 50° F. in such an amount as to produce a completely cured film of .0055" thickness. After 4½ minutes on the casting surface this film was continuously removed under which condition it was found to have a thickness of .011", this thickness being 100% greater than the cured thickness. After evaporation of the residual solvent the product was found to have a tensile strength of 23 kilograms, (15,500 pounds per square inch), a flexibility of 16 folds and a swell and shrink amplitude of .75% in the lengthwise direction and .95% in the widthwise direction. The use of a low temperature casting surface in this operation resulted in coagulation of the cast film in such form that it could be successfully removed from the casting surface at a speed of 4½ minutes, whereas a warmer casting surface (70° F. to 90° F.) would have required either a slower or faster stripping speed to avoid undesirable sticking. This example falls within the lower right hand portion of area D of Fig. 2.

While the acetone-insoluble cellulose acetates having an acetyl range of 42.5% to 44.0% are all operable in producing films of improved physical properties in accordance with our invention, we prefer to employ the acetates having an acetyl content within the range of 43.0% to 43.5% because they provide products for which film cements can be more readily prepared and applied than is the case with films produced from cellulose acetates of higher acetyl content and because cellulose acetates of 43.0% to 43.5% acetyl content are better adapted to the casting and curing conditions of our invention.

The cellulose acetate best suited for our invention has a viscosity at 25° C. of from 3,000 to 10,000 centipoises as determined in a 10% solution by weight in a solvent composed of 90% methylene chloride and 10% anhydrous methyl alcohol by weight.

The ratio of cellulose acetate to solvent mixture most useful in our invention is approximately 1 to 5 although ratios up to 1 to 8 can be employed.

It will be apparent from the above examples and description of our process that it has many advantageous features which distinguish it from the prior art. First and most important is the fact that by an extremely simple expedient, namely, the addition of propylene chloride to the methylene chloride—alcohol primary solvent, we have solved a problem of long standing in the motion picture industry, the problem of how to produce a safety type film which would have physical properties equal to or better than present-day commercial motion picture film so as to permit its ready and convenient use in modern processing and projection apparatus.

Specifically, our invention has, as indicated above, resulted in the provision of a high-acetyl cellulose acetate film having physical properties in all important respects comparable to those of the best commercial motion picture film. This will be apparent from the following tabulation of data obtained by testing representative present-day commercial safety cine film, commercial motion picture film and the film prepared in accordance with the instant invention. At this point it might be well to point out that commercial safety cine films have been used prior to the advent of our invention only for so-called amateur movies. Such film is normally made in 16-mm. width and used in lengths of from 50 to 400 feet. Such films are made from the acetone-soluble type of cellulose acetate (approximately 39–41% acetyl); the mixed esters such as cellulose acetate propionate and cellulose acetate butyrate are also used for such amateur cine film. All of these organic acid esters of cellulose in sheet form have sufficient tensile strength, sufficiently low swell and shrink amplitude, and other properties, to be very useful for amateur purposes for the reason that such film is usually projected only infrequently and is generally handled with a certain amount of care and consideration. However, as shown by the following tabulation, the properties of such safety film are not such as will stand the rigors of repeated projection in the average movie theater, several times a day and for long runs of possibly weeks in succession under conditions typified by the well-known slogan "The show must go on."

of 70° F. For photographic film support of cine positive thickness (.005" to .006"), the time of conditioning should be 2¼ hours.

Strips 15 inches long and 35 mm. wide are cut from the sheet material. Usually two strips from each sample lengthwise and two strips widthwise are used for the test. Two sets of perforations, exactly 10 inches apart, are made in each strip. Measurements from outside edge to outside edge of the perforation holes are taken, using a gauge graduated in thousandths of an inch.

The strips are conditioned at 50% relative humidity and measured. They are then tacked loosely on a wooden rack and placed in a constant temperature thermostatically controlled water bath at 100° F. and left for 17 hours. The samples are then wiped to remove excess moisture and reconditioned at 50% relative humidity and measured again and the dimensional change computed. This test measures the irreversible shrinkage, if any, due to loss of solvent from the film material and also that due to the release of internal mechanical strains.

The samples are then placed in a water bath at 125° F. for 30 minutes, then removed and measured for length as speedily as possible after removing surplus water. The samples are then placed in an oven at 125° F. for one hour then taken out and measured. This cycle is repeated three times or until the difference between the wet and dry readings becomes constant. The difference between the last wet and dry readings in percentage is the per cent swell and shrink amplitude. This test measures the permanent, characteristic tendency of the material to swell

|  | Commercial Safety Cine Films | Commercial Motion Picture Films | High-Acetyl Cellulose Acetate Film Base of Our Invention |
| --- | --- | --- | --- |
| Tensile Strength, p. s. i. | 10,000–12,100 | 13,500–17,000 | 13,500–16,000 |
| Flexibility (Schopper folds) | 5–15 | 15–20 | 15–20 |
| Modulus of Elasticity (tension.10⁵ p. s. i.) | 3.8–4.5 | 5.5–6.5 | 4.8–5.8 |
| Swell and Shrink Amplitude (Lengthwise Direction) | 1.00–2.00 | 0.50–0.80 | 0.60–0.90 |
| Swell in Water at 70° F. (100 minutes) per cent | 0.80–1.50 | 0.20–0.40 | 0.30–0.40 |

"Swell and shrink amplitude" and "swell in water at 70° F." are alternate tests showing the same property in the film base stock; i. e. dimensional stability with moisture. All of the above five tests were made in the lengthwise direction for the reason that, in manufacture, motion picture film, such as that 35 mm. wide or 16 mm. wide, is prepared by slitting lengthwise a much wider sheet, and for the further reason that, due to its great length compared to width and the fact that it travels through a camera, processing machine and projector in the lengthwise direction, good strength and low swell and shrink amplitude in the lengthwise direction is the more important. Under the casting, stripping and curing conditions of our invention, the above properties in the widthwise direction will more or less approximate those in the lengthwise direction but are not of great consequence; hence we have not included them in the above tabulation; some of these properties in the widthwise direction are given in the examples as a matter of interest and comparison.

The swell and shrink amplitude test is conducted as follows: Samples of film or sheeting to be tested are conditioned and measured in a constant humidity room at a relative humidity of 50%, and at a dry bulb thermometer reading and shrink under the influence of absorbed and desorbed moisture.

From the above tabulation the comparability of the physical properties of film produced in accordance with our invention and the properties of present-day commercial motion picture film will be apparent; add to these properties the non-inflammability and stability of the film of our invention and it is easy to perceive the superiority thereof. Also apparent is the improvement in our films over the present-day commercial safety cine films, particularly in the matter of dimensional stability as indicated by their very low swell and shrink amplitude. It is to be noted that the films of the instant invention have a swell and shrink amplitude only about one-half that of commercial safety films and also that their flexibility is much greater so that the film base of our invention is virtually a different kind of film base than previous safety film.

However, of all the features of our invention, the most unusual and important is the fact that the film-forming solutions are so designed that the film is stripped from the casting surface while it is still 50% to 125% thicker than it is to become after it is completely cured. In fact, it appears that the propylene chloride ingredient of the solvent combination actually contributes the peculiar and highly individual characteristics of the film-forming solution which permit it to be cast and stripped under these conditions by bringing about a state of coagulation in the partially cured film which at certain specific stages permits the film readily to be stripped from the coating surface to produce films of satisfactory physical properties. This most unusual aspect of our invention will be more apparent by reference to the curves of Fig. 1, which illustrate the relation of stripping thickness to casting speed when the casting surface is maintained at 70° F. to 80° F.

In every film-making operation primary consideration must be given to the matter of the ultimate or cured thickness of the film. The upper set of curves of Fig. 1 illustrates the relation between the cured film thickness in inches and the film-forming speed when high-acetyl cellulose acetate films are produced in accordance with our invention, speed in this case being expressed in terms of time in minutes during which the film-forming solution has remained on the casting surface, that is, the time which elapses from the instant the solution is deposited on the casting surface to the instant at which it is stripped therefrom. Time on the casting surface is generally referred to as "stripping time." Thus, in this set of curves cured thickness is plotted against stripping time. The lower set of curves, on the other hand, illustrates the relation between the thickness of the film at stripping while it contains a relatively large amount of solvent, and the time in minutes during which it has remained on the casting surface. Thus, in this second set of curves the uncured thickness of the film is plotted against stripping time.

It will be observed that both curves conform to the same general pattern, but that the respective areas delimited by the upper set of curves are smaller than the corresponding areas of the lower set of curves. The difference in the extent of the respective areas of the two sets of curves is, of course, explained by the fact that in the one case conditions are illustrated in which the film is substantially completely cured, while in the other case the film contains appreciable amounts of residual solvent.

Referring to the upper set of curves, the area A represents a range of film-forming operations in which the resulting film will be comparatively well cured at the time of stripping, that is, an area representing casting conditions in which, for a given cured thickness, the film has remained on the film-forming surface for such a length of time as to permit removal of a very substantial percentage of the original solvent. This area, therefore, represents such a slow film-forming operation and conditions in which films of such inferior physical characteristics are produced, as to lie outside the scope of our invention. Area B, on the other hand, represents a range of operation in which, for the same given cured thickness, the film at the time of stripping from the casting surface is approximately 50% to 125% thicker than it is to become when completely cured, by virtue of containing a relatively larger proportion of solvent than does the film if produced under the conditions which fall within area A, and, because of the fact that it contains the larger amount of solvent at stripping, has the ability readily to be stripped from the film-forming surface and to have the desired physical properties. Such conditions of operation lie within the scope of our invention.

Area C represents another range of operation or set of conditions in which, for the same given cured film thickness, the casting speeds are greater than those falling within the conditions of area B. Under such conditions it has been found that, if for the same given cured thickness of film, the film-forming speed is increased, that is, the time on the casting surface is decreased, a point is reached where the film will not strip properly but tends to adhere tightly to, and to leave deposits of film material on, the casting surface. This point is reached at the boundary between area B and area C. As the speed is still further increased a point is reached where the film will again begin to strip properly. This point lies on the boundary between areas C and D. Continuing to assume the same given film thickness, as one further decreases the time during which the film remains on the casting surface, that is, increases the film-forming speed, a point is finally arrived at where any further increase in the film-forming speed results in imperfect stripping and a film of unsatisfactory physical properties. This point is reached at the boundary between areas D and E.

The above-described phenomena will be more fully illustrated by reference to the conditions prevailing when coating a film of a given finally cured thickness, which is within the range of standard cine film, namely, a range of .005" to .006". For example, assuming that the film is to have a cured thickness of .006" and also to possess the desired physical properties of high tensile strength, flexibility and good dimensional stability, it is apparent from the upper set of curves of Fig. 1 that such a film could be cast at two different speeds. By following from right to left along the abscissa corresponding to a cured thickness of .006", it will be observed that the operative range of film-forming speed to obtain a film of satisfactory physical properties begins at the point where the abscissa intersects the lowermost curve, that is, at a point corresponding to a stripping time of approximately 7½ minutes and ends at the point where the abscissa intersects the second curve, that is, at a point corresponding to a stripping time of approximately 5¾ minutes.

However, by reducing the stripping time below 5¾ minutes one runs into the inoperative area C until the stripping time is further reduced to about 4 minutes at which point the film again begins to strip properly and to have good physical properties. The speed may then be further increased until a minimum stripping time of 3 minutes is attained, at which time poor stripping and unsatisfactory physical properties again begin to appear.

It will thus be seen that our film-forming solutions are susceptible of satisfactory casting at two distinct speeds, one roughly twice the other. This is a most unusual phenomenon and one which has not been observed with any other film-forming compositions.

We have referred to the fact that, in accordance with our invention, to produce a high-acetyl cellulose acetate film having the desired physical properties the film must be stripped from the film-forming surface while it is 50% to 125% thicker than it is to become when cured. This is illustrated graphically by a comparison between the upper and lower sets of curves of Fig. 1. For example, assuming the same cured thickness as above, namely .006", if one follows down the ordinate from the point where the .006"

thickness abscissa intersects the lowermost curve of the upper set of curves at the point $a$ corresponding to a stripping time of about 7½ minutes, it will be found that this ordinate intersects the corresponding lowermost curve of the lower set at the point $a'$ corresponding to a stripping thickness of about .009". The difference between the two thicknesses is .003". Therefore, the ultimately cured film of .006" thickness was stripped from the casting surface while it contained such an amount of solvent as to make it at least 50% thicker in that condition than its final cured thickness of .006".

On the other hand, if it is desired to increase the film-forming speed to the maximum for the production of this same ultimate cured thickness, it will be observed that this will be attained at the point where the .006" abscissa intersects the boundary between areas D and E at the point $b$ of the upper set of curves. If one follows down the ordinate from this point to the point where the ordinate intersects the corresponding curve of the lower set at the point $b'$, the stripping thickness will be found to be about .0135", this thickness thus being approximately 125% of the cured thickness.

If the temperature of the casting surface is lowered, somewhat different stripping characteristics result, as shown in the curves of Fig. 2, which illustrates operating conditions for producing a product of approximately .0055" cured thickness. The shaded area A represents slow stripping speeds, in which the film is not stripped in a coagulated condition as described by our process and does not, therefore, result in good physical properties. The clear area B represents the operative range in which a strippable sheet is formed, which may be removed from the casting surface within a stripping thickness range of .0083" to .0125" or approximately 50% to 125% greater than the cured thickness. The shaded area C represents the range in which the partially cured film adheres to the casting surface and cannot be stripped successfully. The upper clear area D represents a higher speed range of operation, in which the film is in the form of a strippable sheet which does not stick to the casting surface and can be stripped while 50% to 125% thicker than it is to become when completely cured. The shaded area E represents an insufficient degree of curing to permit stripping.

While present cinefilm base stock has a more or less standard thickness of .005" to .006", it will be seen from the curves or graphs of Fig. 1 that our invention is applicable to high-acetyl cellulose acetate base stock ranging in thickness from .004" to .010" and, in the claims, safety cinefilm base stock will be understood to refer to this range of thickness.

In Fig. 2 we have shown a casting surface temperature range of from 50° F. to 90° F., and this is the practical operating range of casting surface temperature for our invention. If one maintains the film-casting surface at a temperature much in excess of 90° F., evaporation takes place with such rapidity that bubbles will form in the acetate sheet and thus give a film base stock which would not be useable. On the other hand, if one attempts to operate our invention with a film-casting surface maintained at a temperature much below 50° F., the curing time before stripping can be accomplished increases to a point where little or nothing is gained by attempted use of the invention. Accordingly, we have established the limits of 50° F. to 90° F. as the practical limits within which to maintain the film-casting surface.

It will be understood, of course, that the graph constituting Fig. 2 is drawn for a finel cured thickness of .0055" for the acetate sheet and that this graph is constructed to show variation in stripping time resulting from variation in temperature of the film-casting surface from 50° F. to 90° F. for this particular final thickness of acetate sheet.

What we claim is:

1. As a new composition of matter, a cellulose acetate film-forming solution capable of being cast in the form of a sheet at two distinct ranges of film-forming speed for a given cured film thickness, said solution being composed of cellulose acetate having an acetyl content within the range of 42.5% to 44.0% dissolved in a solvent mixture composed of 65% to 90% by weight of methylene chloride, 15% to 5% of an unsubstituted aliphatic monohydric alcohol of 1 to 2 carbon atoms and 20% to 5% propylene chloride.

2. As a new composition of matter, a cellulose acetate film-forming solution capable of being cast in the form of a sheet at two distinct ranges of film-forming speed for a given cured film thickness, said solution being composed of cellulose acetate having an acetyl content within the range of 43.0% to 43.5% dissolved in a solvent mixture composed of 65% to 90% by weight of methylene chloride, 15% to 5% of an unsubstituted aliphatic monohydric alcohol of 1 to 2 carbon atoms and 20% to 5% propylene chloride.

3. As a new composition of matter, a cellulose acetate film-forming solution capable of being cast in the form of a sheet at two distinct ranges of film-forming speed for a given cured film thickness, said solution being composed of cellulose acetate having an acetyl content within the range of 43.0% to 43.5% dissolved in a solvent mixture composed of 80% by weight of methylene chloride, 10% methyl alcohol and 10% propylene chloride.

CHARLES R. FORDYCE.
BRUCE E. GRAMKEE.

REFERENCES CITED

The following references are of record in the file of this patent:

UNITED STATES PATENTS

| Number | Name | Date |
|---|---|---|
| 1,384,188 | Goemer | July 12, 1921 |
| 1,668,946 | Clark et al. | May 8, 1928 |
| 1,844,365 | Moss | Feb. 9, 1932 |
| 1,880,067 | Barthelemy | Sept. 27, 1932 |
| 1,880,466 | Noller | Oct. 4, 1932 |
| 1,896,145 | Stand et al. | Feb. 7, 1933 |
| 1,930,134 | Smith | Oct. 10, 1933 |
| 1,969,183 | Reid | Aug. 7, 1934 |
| 2,000,622 | Taylor | May 7, 1935 |
| 2,037,292 | Weihe | Apr. 14, 1936 |
| 2,150,250 | Scott | Mar. 14, 1939 |
| 2,232,012 | Rooney | Feb. 18, 1941 |
| 2,319,052 | Fordyce | May 11, 1943 |

FOREIGN PATENTS

| Number | Country | Date |
|---|---|---|
| 512,967 | Great Britain | Sept. 29, 1939 |